(12) United States Patent
Thacker et al.

(10) Patent No.: US 11,568,600 B2
(45) Date of Patent: *Jan. 31, 2023

(54) SYSTEMS AND METHODS FOR GENERATING VOXEL-BASED THREE-DIMENSIONAL OBJECTS IN A VIRTUAL SPACE BASED ON NATURAL LANGUAGE PROCESSING (NLP) OF A USER-PROVIDED DESCRIPTION

(71) Applicant: Mythical, Inc., Sherman Oaks, CA (US)

(72) Inventors: Cameron Thacker, Sherman Oaks, CA (US); John Linden, Sherman Oaks, CA (US)

(73) Assignee: Mythical, Inc., Sherman Oaks, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/532,457

(22) Filed: Nov. 22, 2021

(65) Prior Publication Data

US 2022/0084284 A1    Mar. 17, 2022

Related U.S. Application Data

(63) Continuation of application No. 17/118,321, filed on Dec. 10, 2020, now Pat. No. 11,232,631, which is a
(Continued)

(51) Int. Cl.
*G06T 17/10* (2006.01)
*G06T 9/00* (2006.01)
(Continued)

(52) U.S. Cl.
CPC ............ *G06T 17/10* (2013.01); *G06F 40/14* (2020.01); *G06F 40/40* (2020.01); *G06T 9/00* (2013.01); *G06T 2200/24* (2013.01)

(58) Field of Classification Search
None
See application file for complete search history.

(56) References Cited

U.S. PATENT DOCUMENTS

| | | |
|---|---|---|
| 7,627,536 B2 | 12/2009 | Kacmarcik |
| 9,904,669 B2 | 2/2018 | Gunaratna |

(Continued)

OTHER PUBLICATIONS

Gizel ("Fused voxel autoencoder for single image to 3D object reconstruction" Electronics Letters Feb. 6, 2020 vol. 56 No. 3 pp. 134-137) (Year: 2020).*

(Continued)

*Primary Examiner* — Tapas Mazumder
(74) *Attorney, Agent, or Firm* — Esplin & Associates, PC

(57) ABSTRACT

Systems and methods for using natural language processing (NLP) to automatically generate three-dimensional objects in a virtual space are disclosed. Exemplary implementations may: obtain three-dimensional objects using a three-dimensional voxelized format; encode those objects, using a variational autoencoder, into pairs of vectors that are subsequently sampled; decode the sampled vectors; determine loss information for the decoded voxelized three-dimensional objects; use the loss information to train the variational autoencoder; fine-tune a pretrained text-based system; receive user input describing a three-dimensional object; generate a vector from the user input; decode the vector into a voxelized three-dimensional object; present the voxelized three-dimensional object to the user.

18 Claims, 8 Drawing Sheets

Related U.S. Application Data continuation of application No. 16/948,294, filed on Sep. 11, 2020, now Pat. No. 10,930,066.

(51) Int. Cl.
  *G06F 40/14* (2020.01)
  *G06F 40/40* (2020.01)

(56) References Cited

U.S. PATENT DOCUMENTS

| | | | |
|---|---|---|---|
| 9,908,052 | B2 | 3/2018 | Allen |
| 10,930,066 | B1 | 2/2021 | Thacker |
| 11,077,367 | B1 | 8/2021 | Thacker |
| 2007/0015121 | A1 | 1/2007 | Johnson |
| 2007/0288404 | A1 | 12/2007 | Kacmarcik |
| 2008/0242425 | A1 | 10/2008 | Isaka |
| 2011/0320965 | A1 | 12/2011 | Hairman |
| 2013/0060811 | A1 | 3/2013 | Dircks |
| 2015/0121216 | A1 | 4/2015 | Brown |
| 2015/0338917 | A1 | 11/2015 | Steiner |
| 2016/0059134 | A1 | 3/2016 | Tait |
| 2017/0091659 | A1 | 3/2017 | Matthew |
| 2017/0185915 | A1 | 6/2017 | Chawla |
| 2018/0357922 | A1 | 12/2018 | Dutta |
| 2019/0046879 | A1 | 2/2019 | Halper |
| 2019/0108215 | A1 | 4/2019 | Jaroch |
| 2019/0311547 | A1* | 10/2019 | Oh .................. B33Y 50/00 |
| 2019/0325028 | A1 | 10/2019 | Palanichamy |
| 2020/0101383 | A1 | 4/2020 | Hwang |
| 2020/0184668 | A1* | 6/2020 | Rad .................. G06N 3/08 |
| 2020/0233400 | A1* | 7/2020 | Wright ............. G05B 19/40932 |
| 2020/0250540 | A1 | 8/2020 | Mehr |
| 2020/0269136 | A1 | 8/2020 | Gurumurthy |
| 2021/0287430 | A1* | 9/2021 | Li .................. G06V 10/26 |

OTHER PUBLICATIONS

Ashish Vaswani, et al. : Attention Is All You Need, 31st Conference on Neural Information Processing Systems (NIPS 2017), pp. 1-11.

Kantaro Fukamizu, et al. : Generation High resolution 3D model from natural language by Generative Adversarial Network. Jan. 22, 2019; pp. 1-9.

Jiajun Wu, et al. : Learning a Probabilistic Latent Space of Object Shapes via 3D Generative-Adversarial Modeling, 29th Conference on Neural Information Processing Systems (NIPS 2016), pp. 1-11.

Ian J. Goodfellow, et al. : Generative Adversarial Nets, Jun. 10, 2014, 9 pgs.

Kevin Chen, et al. : Text2Shape: Generating Shapes from Natural Language by Learning Joint Embeddings, Mar. 22, 2018; pp. 1-35.

Diederik Kingma, et al. : An Introduction to Variational Autoencoders, Foundations and Trends in Machine Learning, Dec. 11, 2019, 89 pages.

Pierre Baldi : Autoencoders, Unsupervised Learning, and Deep Architectures, JMLR: Workshop and Conference Proceedings 27:37{50, 2012, 37 pages.

Lee Seversky, et al. : Real-time Automatic 3D Scene Generation from Natural Language Voice and Text Descriptions; Department of Computer Science State University of New York at Binghamton; Oct. 23-27, 2006, 4 pgs.

Zhirui Zhang, et al. : Bidirectional Generative Adversarial Networks for Neural Machine Translation, University of Science and Technology of China, Oct. 31-Nov. 1, 2018, pp. 189-190.

Pranav Gandhi, et al. : Generating 3D Models Using 3D Generative Adversarial Network, International Research Journal of Engineering and Technology,Apr. 2019, pp. 886-890.

Anonymous authors (paper under review) : Hierarchical Bayes Autoencoders, 2020, pp. 1-11.

Mark Chen, et al. : Generative Pretraining from Pixels, Mar. 22, 2018, pp. 1-35.

Angel Chang, et al. : Text to 3D Scene Generation with Rich Lexical Grounding, Jul. 2015, 15 pgs.

Vincent, James, "Openai's Latest Breakthrough Is Astonishingly Powerful, but Still Fighting Its Flaws The ultimate autocomplete", Jul. 30, 2020, https://www.theverge.com/21346343/gpt-3-explainer-openai-examples-errors-agi-potential ( Year: 2020), 16 pages.

Guzel, Fused voxel autoencoder for single image to 3D object reconstruction, Electronics Letters Feb. 6, 2020 vol. 56 No. 3 pp. 134-137. (Year: 2020).

\* cited by examiner

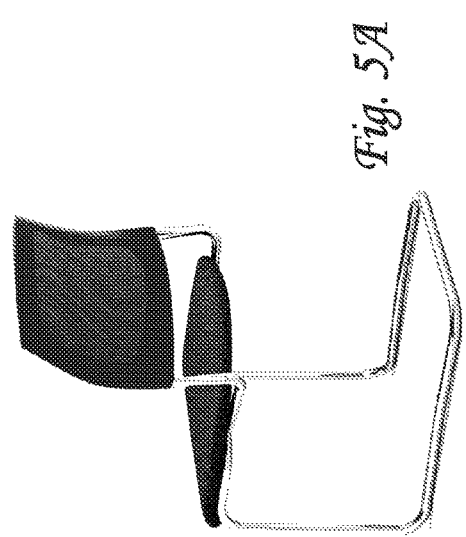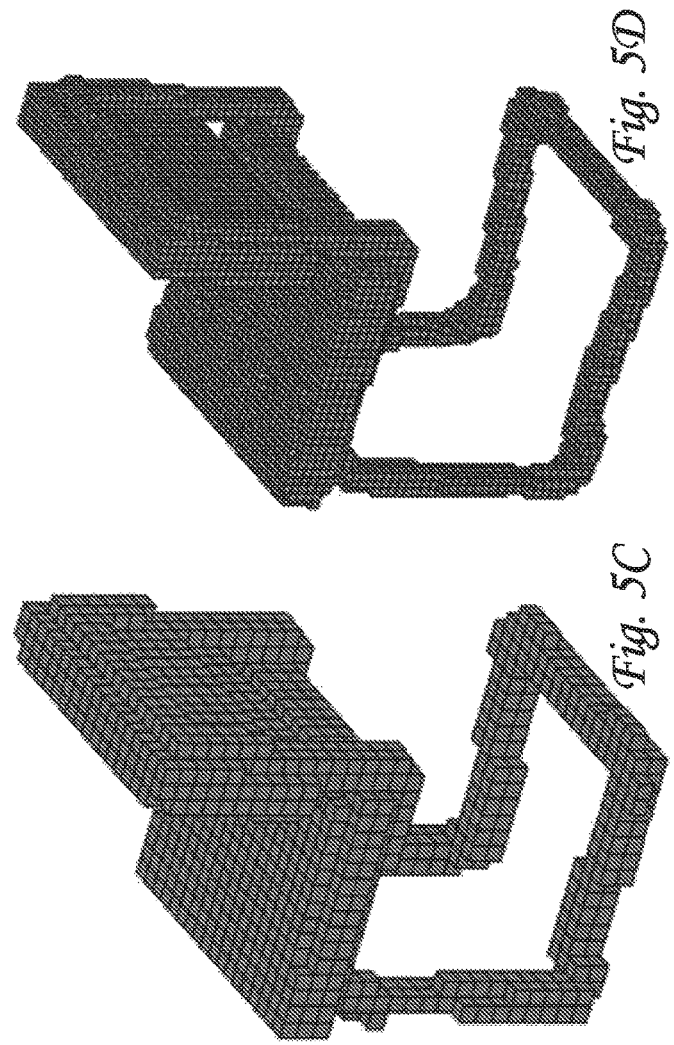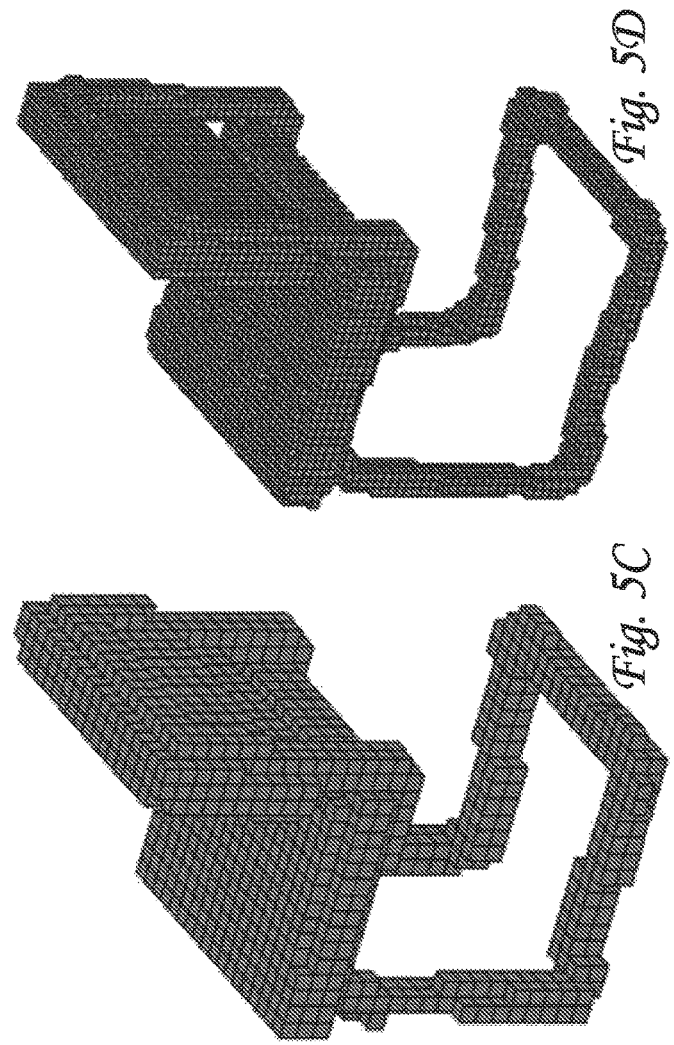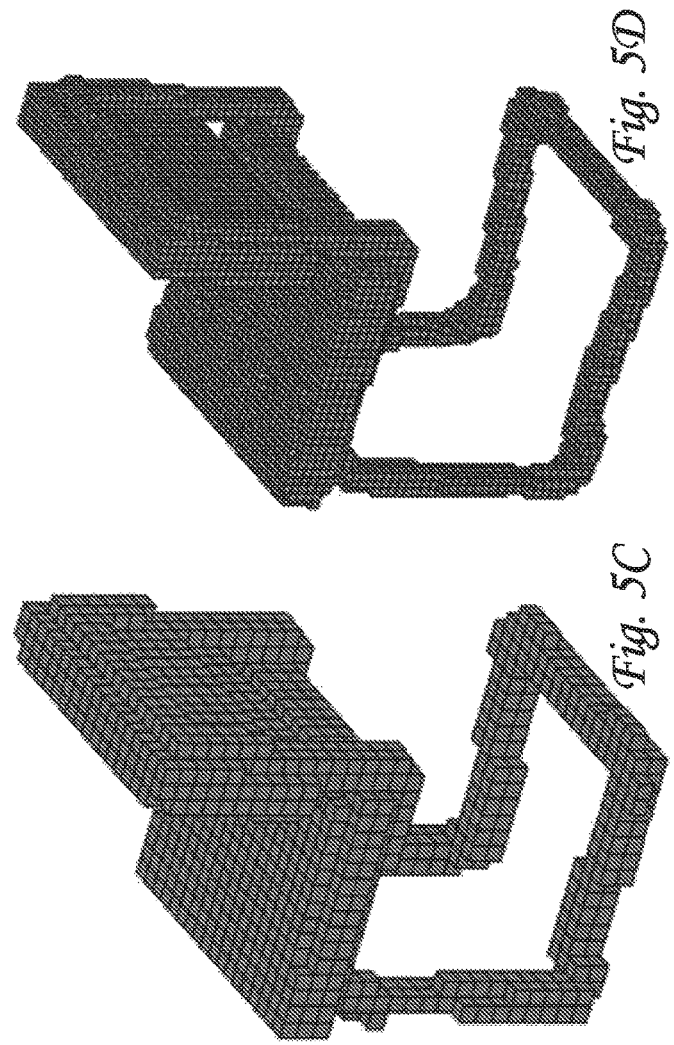

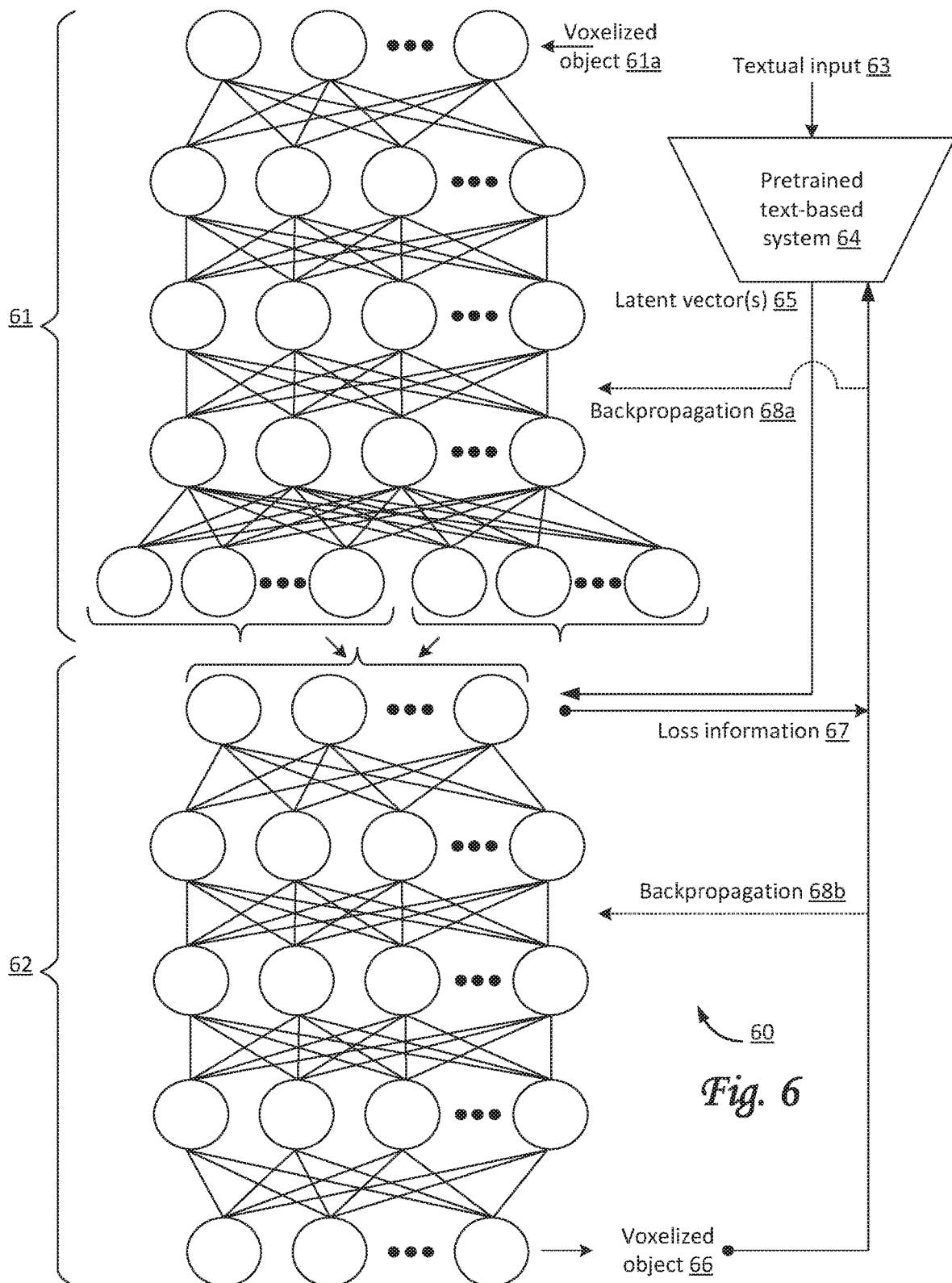

SYSTEMS AND METHODS FOR GENERATING VOXEL-BASED THREE-DIMENSIONAL OBJECTS IN A VIRTUAL SPACE BASED ON NATURAL LANGUAGE PROCESSING (NLP) OF A USER-PROVIDED DESCRIPTION

FIELD OF THE DISCLOSURE

The present disclosure relates to systems and methods for using natural language processing (NLP) to automatically generate three-dimensional objects in a virtual space.

BACKGROUND

Online gaming platforms using three-dimensional virtual spaces are known. Voxels are known, and may be used to form three-dimensional objects. User-generated three-dimensional content is known.

SUMMARY

One aspect of the present disclosure relates to a system configured to use natural language processing (NLP) to automatically generate three-dimensional objects in a virtual space. The system may include electronic storage, one or more hardware processors, and/or other components. The electronic storage may be configured to electronically store information. The stored information may include a set of three-dimensional objects. The set may include an annotated object that includes a textual description of the annotated object and an unannotated object that lacks a description. The annotated object may use a first three-dimensional format. The unannotated object may use a second three-dimensional format. The one or more hardware processors may be configured by machine-readable instructions. The one or more hardware processors may obtain the set of three-dimensional objects. The one or more hardware processors may convert one or more three-dimensional objects in the set into one or more objects using a three-dimensional voxelized format that natively supports voxels, responsive to using three-dimensional formats that fail to support voxels, such that the set includes voxelized three-dimensional objects. The voxelized three-dimensional objects may include a first voxelized object based on the annotated object. The one or more hardware processors may encode, using a variational autoencoder that includes an encoder and a decoder, the voxelized three-dimensional objects into pairs of multi-dimensional vectors. Individual pairs may include a vector of means and a vector of standard deviations. The one or more hardware processors may create sampled multi-dimensional vectors having a particular dimensionality by sampling from the individual pairs of multi-dimensional vectors such that a first sampled multi-dimensional vector is created based on an encoding of the first voxelized object. The one or more hardware processors may decode the sampled multi-dimensional vectors into decoded voxelized three-dimensional objects. The one or more hardware processors may determine loss information for the decoded voxelized three-dimensional objects by comparing the decoded voxelized three-dimensional objects to corresponding individual voxelized three-dimensional objects. The one or more hardware processors may use the loss information to train the variational autoencoder. The one or more hardware processors may fine-tune a pretrained text-based system to generate multi-dimensional vectors having the particular dimensionality from textual descriptions included in annotated objects in the set of three-dimensional objects, wherein one or more prompts for the pretrained text-based system are based on a combination of the textual description of the annotated object and the first sampled multi-dimensional vector. The one or more hardware processors may receive, from a user, a user input, wherein the user input includes user-provided text describing a three-dimensional object. The one or more hardware processors may generate, using the fine-tuned pretrained text-based system, a user-provided multi-dimensional vector from the user-provided text in the user input. The one or more hardware processors may decode, using the decoder, the user-provided multi-dimensional vector into a user-provided voxelized three-dimensional object. The one or more hardware processors may present, to the user, the user-provided voxelized three-dimensional object.

Another aspect of the present disclosure relates to a method to use natural language processing (NLP) to automatically generate three-dimensional objects in a virtual space. The method may be implemented in a computer system including electronic storage, one or more hardware processors, and/or other components. The method may include obtaining a set of three-dimensional objects. The set may include an annotated object that includes a textual description of the annotated object and an unannotated object that lacks a description. The annotated object may use a first three-dimensional format. The unannotated object may use a second three-dimensional format. The method may include converting one or more three-dimensional objects in the set into one or more objects using a three-dimensional voxelized format that natively supports voxels, responsive to using three-dimensional formats that fail to support voxels, such that the set includes voxelized three-dimensional objects, wherein the voxelized three-dimensional objects include a first voxelized object based on the annotated object. The method may include encoding, using a variational autoencoder that includes an encoder and a decoder, the voxelized three-dimensional objects into pairs of multi-dimensional vectors, wherein individual pairs include a vector of means and a vector of standard deviations. The method may include creating sampled multi-dimensional vectors having a particular dimensionality by sampling from the individual pairs of multi-dimensional vectors such that a first sampled multi-dimensional vector is created based on an encoding of the first voxelized object. The method may include decoding, using the decoder, the sampled multi-dimensional vectors into decoded voxelized three-dimensional objects. The method may include determining loss information by comparing the decoded voxelized three-dimensional objects to corresponding individual voxelized three-dimensional objects. The method may include using the loss information to train the variational autoencoder and the decoder. The method may include fine-tuning a pretrained text-based system to generate multi-dimensional vectors having the particular dimensionality from textual descriptions included in annotated objects in the set of three-dimensional objects, wherein one or more prompts for the pretrained text-based system are based on a combination of the textual description of the annotated object and the first sampled multi-dimensional vector. The method may include receiving, from a user, a user input, wherein the user input includes user-provided text describing a three-dimensional object. The method may include generating, using the fine-tuned pretrained text-based system, a user-provided multi-dimensional vector from the user-provided text in the user input. The method may include decoding, using the decoder, the user-provided multi-dimensional vector into a user-provided voxelized three-dimensional object. The method may include presenting, to the user, the user-provided voxelized three-dimensional object.

As used herein, any association (or relation, or reflection, or indication, or correspondency) involving servers, processors, client computing platforms, user interfaces, three-dimensional objects, neural networks, databases, formats, voxels, encoders, decoders, generators, discriminators, vectors, (loss) information, pretrained text-based systems, instructions, operations, determinations, presentations, and/ or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 5A-5B-5C-5D illustrate exemplary three-dimensional objects, as may be used by a system configured for using natural language processing (NLP) to automatically generate three-dimensional objects in a virtual space.

FIG. 6 illustrates exemplary dataflow for different stages in a system configured for using natural language processing (NLP) to automatically generate three-dimensional objects in a virtual space.

DETAILED DESCRIPTION

Figure 1:
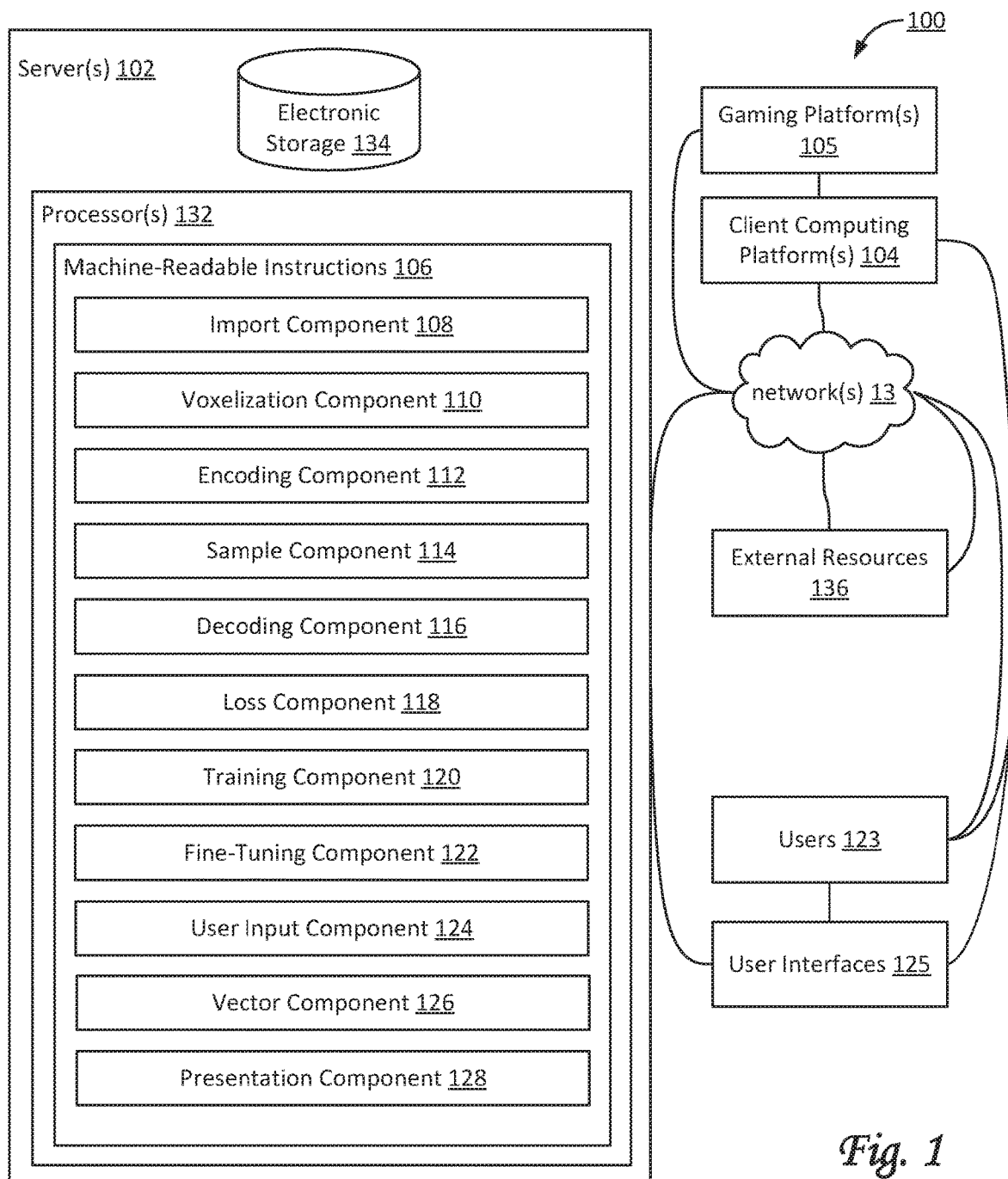
FIG. 1 illustrates a system configured for using natural language processing (NLP) to automatically generate three-dimensional objects in a virtual space, in accordance with one or more implementations.

FIG. 1 illustrates a system 100 configured for using natural language processing (NLP) to automatically generate three-dimensional objects in a virtual space. In some implementations, there are at least three stages to using natural language processing (NLP) to automatically generate three-dimensional objects in a virtual space: in a first stage, a generative neural network, such as is part of a (variational) autoencoder, is trained on a set of three-dimensional models; in a second stage, a pretrained text-based system is fine-tuned to generate the same latent vectors used by the autoencoder, based on the annotated textual description of the set of three-dimensional models; and in a third stage, new textual input from a user is processed by the fine-tuned pretrained text-based system to generate a latent vector that serves as input to the same decoder as was used for the autoencoder, thus generating a three-dimensional object that is based on the new textual input from the user.

In some implementations, system 100 may include one or more of electronic storage 134, one or more servers 102, one or more client computing platforms 104, one or more gaming platforms 105, one or more external resources 136, one or more user interfaces 125, and/or other components. Users 123 (also referred to as players) may include one or more of a first user, a second user, a third user, a fourth user, and/or other users. Users 123 may wish to automatically generate, based on descriptive textual input, three-dimensional objects suitable for use in one or more gaming platforms 105, such as an object that can be used in a virtual space that is part of an online game within one or more gaming platforms 105. For example, a user may wish to use such objects to build a scene, a mini-game, and/or an environment within the virtual space, such that users (through their in-game characters) can interact with such objects.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 123 may access system 100 via client computing platform(s) 104. In some implementations, system 100 and/or server(s) 102 may be configured to communicate with one or more of (online) gaming platform(s) 105, users 123, and/or other components. Users 123 may include players who play and/or otherwise interact on gaming platform 105.

Server(s) 102 may be configured by machine-readable instructions 106. Machine-readable instructions 106 may include one or more instruction components. The instruction components may include computer program components. The instruction components may include one or more of an import component 108, a voxelization component 110, an encoding component 112, a sample component 114, a decoding component 116, a loss component 118, a training component 120, a fine-tuning component 122, a user input component 124, a vector component 126, a presentation component 128, and/or other instruction components.

Figure 3A:
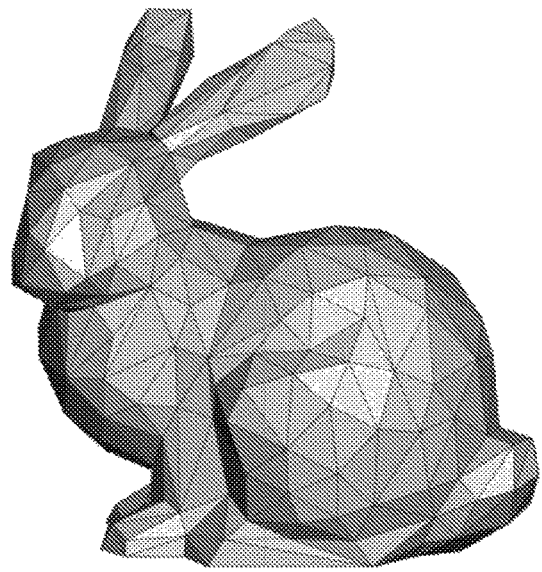
FIGS. 3A-3B-3C-3D-3E illustrate exemplary three-dimensional objects, as may be used by a system configured for using natural language processing (NLP) to automatically generate three-dimensional objects in a virtual space.
Figure 3B:
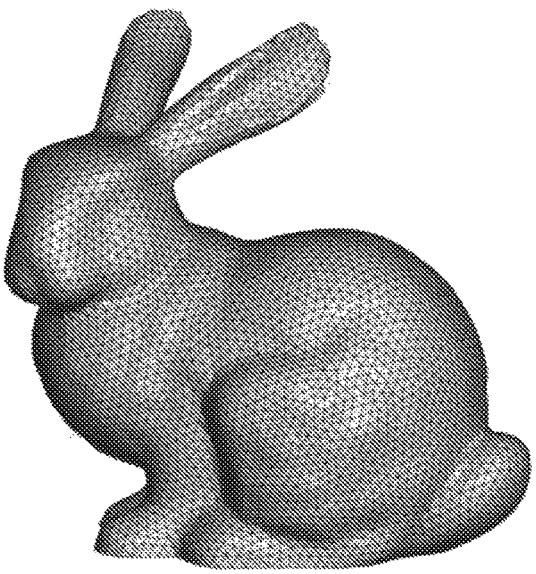
Figure 3C:
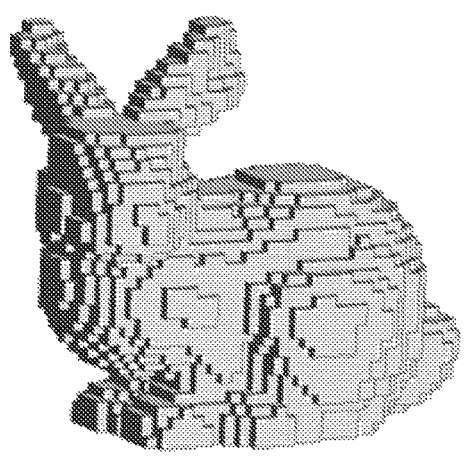
Figure 3D:
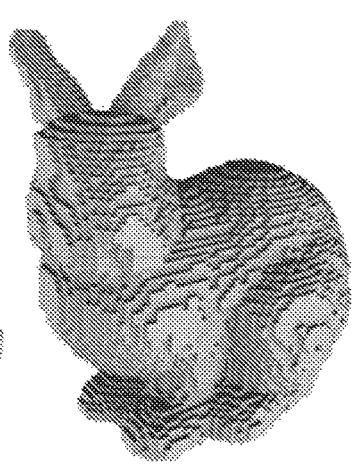
Figure 3E:
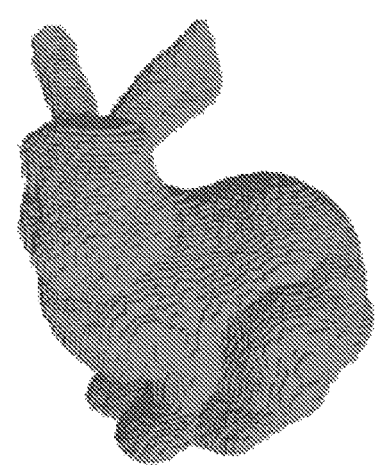

Import component 108 may be configured to obtain one or more sets of three-dimensional objects. In some implementations, individual sets may be referred to as training sets. Individual objects may include annotated objects. In some implementations, individual objects may include unannotated objects. In some implementations, an annotated object may include a textual description of the annotated object. Individual objects may use different three-dimensional formats. For example, a first object may use a first three-dimensional format, a second object may use a second three-dimensional format, and so forth. In some implementations, one or more three-dimensional formats may be based on vectors. In some implementations, one or more three-dimensional formats may be based on point clouds. In some implementations, one or more three-dimensional formats may be based on polygons. For example, a particular object may be described using a triangle mesh. By way of non-limiting example, FIGS. 3A and 3B illustrate objects using a three-dimensional format based on triangles, where FIG. 3A has a course resolution and FIG. 3B has the same shape, but a finer resolution. In some implementations, individual objects may use a three-dimensional voxelized formats that natively supports voxels, i.e., using voxels to describe the three-dimensional shape of the individual objects. By way of non-limiting example, FIGS. 3C, 3D, and 3E illustrate objects using a three-dimensional format based on voxels, where FIG. 3C has a course resolution, FIG. 3D has the same shape, but a finer resolution, and FIG. 3E has the same shape, with an even finer resolution. A set of three-dimensional objects may include subsets based on whether the objects are annotated, and/or whether the objects use a particular format, and/or based on other characteristics. Typically, sets of annotated objects may have fewer objects than sets of unannotated objects. In some implementations, a set of annotated objects may be made available for public use, e.g., for the training of neural networks (including but not limited to autoencoders) and/or other purposes. Examples of such public sets of annotated objects include ModelNet, PartNet, ShapeNet, PointNet, and/or StructureNet (typically made available by certain universities). In some implementations, for the first stage, both annotated subsets and unannotated subsets of three-dimensional objects may be used. In some implementations, for the second stage, only annotated subsets and/or objects may be used.

Voxelization component 110 may be configured to convert a three-dimensional object from one three-dimensional format into another three-dimensional format. For example, a particular object may use a particular three-dimensional format that fails to support voxels, e.g., a format using a triangle mesh. Voxelization component 110 may convert the particular object into an object have a similar shape that uses a three-dimensional voxelized format that natively supports voxels, such as, by way of non-limiting example, one of .OBJ, .JSON, .XML, .SCHEMATIC, .SCAD, .STL, .QB, and .VOX. By way of non-limiting example, voxelization component 110 may convert an object using a triangle-based format, such as illustrated in FIG. 3A, into a similar object using a voxel-based format, such as illustrated in FIG. 3C. In some implementations, voxelization component 110 may be configured to convert a three-dimensional object from one resolution into another resolution. For example, a particular object may use a particular three-dimensional voxelized format (say, 128×128×128 voxels). Voxelization component 110 may convert the particular object into an object have a similar shape that uses a different three-dimensional voxelized format (say, 32×32×32 voxels). By way of non-limiting example, voxelization component 110 may convert a voxelized object using a particular resolution, such as illustrated in FIG. 3D, into a similar object using a different resolution, such as illustrated in FIG. 3C and FIG. 3E. By way of non-limiting example, voxelization component 110 may convert an object using a first format, such as illustrated in FIG. 5A, into one or more similar objects using a voxel-based format, such as illustrated in FIGS. 5B-5C-5D. In some implementations, voxelization component 110 may be configured to execute as described, responsive to an object and/or a subset of objects using a different format and/or resolution than is used by the rest of system 100, in particular by encoding component 112.

Encoding component 112 may be configured to encode voxelized three-dimensional objects into one or more vectors of a particular dimensionality. In some implementations, encoding component 112 may use an autoencoder (i.e., an artificial neural network used to learn efficient data encodings, e.g., in an unsupervised manner). In some implementations, encoding component 112 may use a variational autoencoder that includes an encoder and a decoder, to encode voxelized three-dimensional objects into pairs of multi-dimensional vectors, wherein individual pairs include a vector of means and a vector of standard deviations. In some implementations, resulting vectors are referred to as representations of the input (here, the voxelized three-dimensional objects), or as a latent vectors. In some implementations, encoding component 112 may use an autoencoder using a non-unimodal Gaussian distribution for its resulting set of vectors. In some implementations, the dimensionality of the vectors generated by encoding component 112 may be 32 bits, 64 bits, 128 bits, 256 bits, 512 bits, 1024 bits, 2048 bits, and/or another number of bits.

Figure 4A:
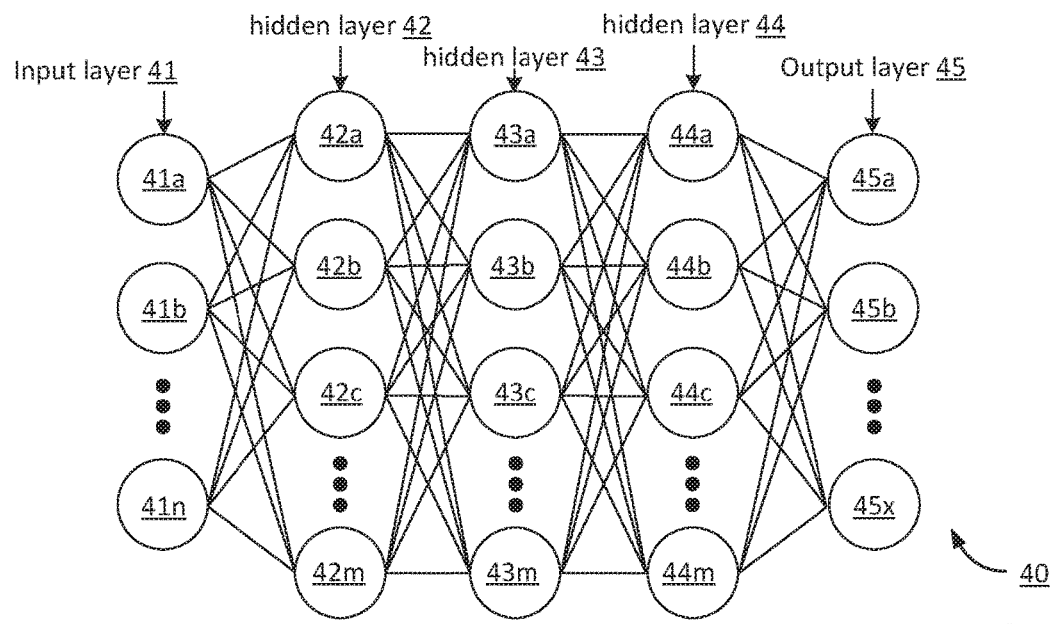
FIG. 4A illustrates dataflow in the encoder portion of an autoencoder, as may be used by a system configured for using natural language processing (NLP) to automatically generate three-dimensional objects in a virtual space.

By way of non-limiting example, FIG. 4A illustrates the encoder portion 40 of an autoencoder, including an input layer 41 of nodes, hidden layers 42, 43, and 44, and output layer 45. For example, input nodes 41a, 41b, . . . , 41n may represent n inputs to encoder portion 40, and each input may represent an individual voxel. For example, for a voxelized object having a 32×32×32 resolution, the corresponding encoder portion may have 32768 inputs (or fewer of some optimization or compression has been used, or more if a single voxel is represented by multiple inputs). The depiction of three hidden layers is merely exemplary, and another numbers of hidden layers are considered within the scope of this disclosure. Hidden nodes 42a, 42b, . . . , 42m may represent m nodes connected to input layer 41. Hidden nodes 43a, 43b, . . . , 43m may represent m nodes connected to hidden layer 42. Hidden nodes 44a, 44b, . . . , 44m may represent m nodes connected to hidden layer 43. The number m may be different for different hidden layers, and typically gets smaller towards output layer 45, where output nodes 45a, 45b, . . . , 45x may represent x output nodes, connected to hidden layer 44. Typically, the number x is much smaller than n or m. Output layer 45 represents a multidimensional vector of a particular dimensionality (here, a dimensionality of x). Here, encoder portion 40 is depicted as fully connected, but that is merely an example, and not intended to be limiting.

Figure 4B:
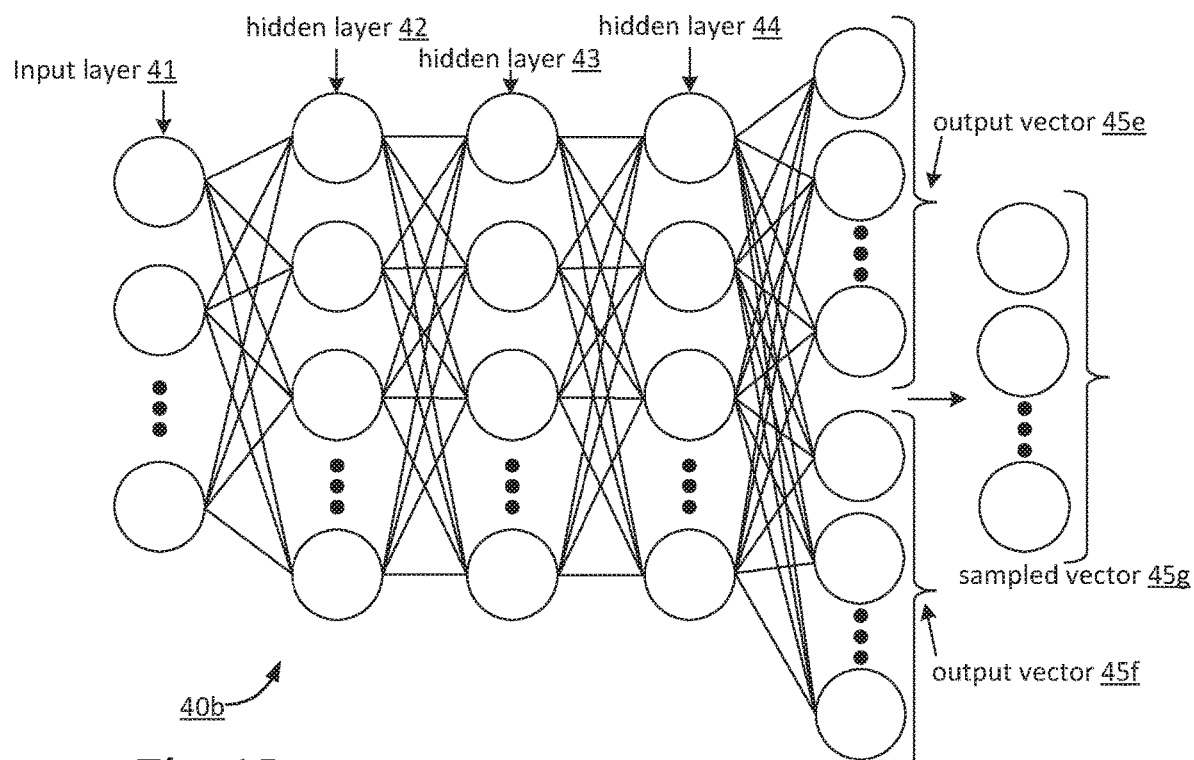
FIG. 4B illustrates dataflow in the encoder portion of a variational autoencoder, as may be used by a system configured for using natural language processing (NLP) to automatically generate three-dimensional objects in a virtual space.
Figure 4C:
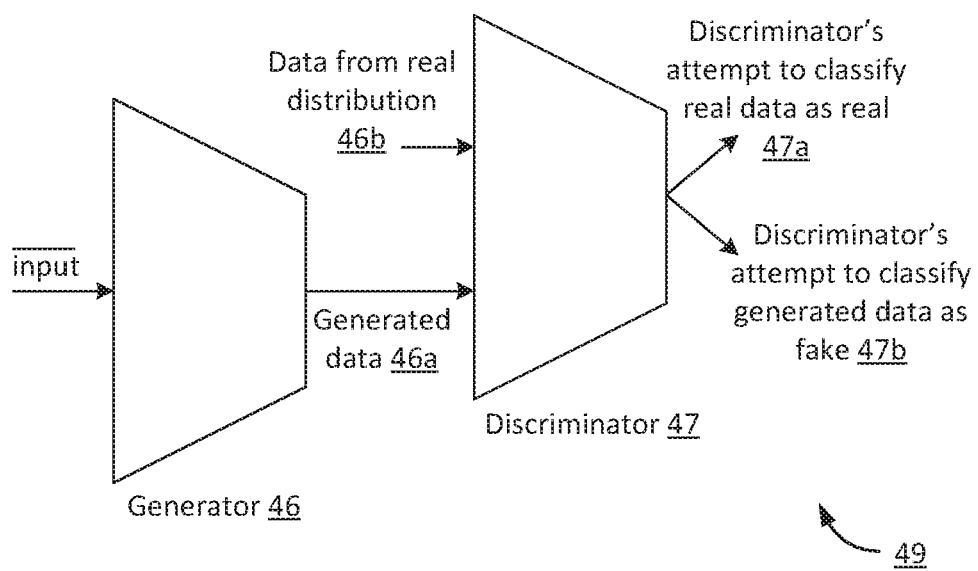
FIG. 4C illustrates dataflow in a Generative Adversarial Network (GAN), as may be used by a system configured for using natural language processing (NLP) to automatically generate three-dimensional objects in a virtual space.

Decoding component 116 may be configured to decode multi-dimensional vectors into voxelized three-dimensional objects. In some implementations, decoding component 116 may use the decoder portion of a (variational) autoencoder. By way of non-limiting example, the decoder portion may be similar to encoder portion 40 as shown in FIG. 4A, but with input and output reversed, and the data flowing in the opposite direction, from the latent vector with dimensionality x (here, layer 45), via hidden layers 44, 43, and 42, to the resulting representation of a voxelized object (here, layer 41). The resulting voxelized three-dimensional object generated by decoding component 116 may be used to train (e.g., using backpropagation) the encoding and decoding functionality (e.g., by training the autoencoder). In some implementations, decoding component 116 may include a portion of a Generative Adversarial Network (GAN), e.g., a bidirectional GAN or BiGAN. By way of non-limiting example, FIG. 4C illustrates a Generative Adversarial Network 49 (GAN), including a generator 46 configured to generate generated data 46a (from an input, such as noise, or a randomized latent vector) and a discriminator 47 configured to take generated data 46a and data from a real distribution 46b as inputs, and further configured to attempt to classify its inputs as either real data 47a or fake data 47b. Here, the real distribution may include pre-existing three-dimensional objects (e.g., from the training set). As the generator learns to produce convincing three-dimensional objects, the discriminator learns to distinguish real (or actual) objects from generated objects that are generated by generator 46. Generator 46 and discriminator 47 acts as adversaries. In some implementations, a generator similar to generator 46 may be used as the decoder for decoding component 116, thus combining features of the autoencoder with a GAN. In some implementations, the decoder portion of an autoencoder may be used as a generator of a GAN to produce fake/generated objects as input for the discriminator, thus combining features of the autoencoder with a GAN.

Loss component 118 may be configured to determine loss information, e.g., for voxelized three-dimensional objects (as generated by decoding component 116). In some implementations, loss information may be determined by comparing the generated voxelized three-dimensional objects to the corresponding (pre-existing) three-dimensional objects as encoded by encoding component 112. In some implementations, loss information may include reconstruction loss (e.g., for encoding and decoding using an autoencoder). Loss information may be used by training component 120 to improve the encoding and/or decoding operations. In some implementations, loss information may include Kullback-Leibler loss, which may be determined based on a sum of Kullback-Leibler divergences. In some implementations, e.g., when using a Generative Adversarial Network (GAN), the loss information may be based on the accuracy of the discriminator. In some implementations, loss information may be determined for latent vectors (i.e., by comparing a previously generated latent vector with a newly generated latent vector, where both latent vectors are generated through different dataflows).

In some implementations, objects generated using an autoencoder may be limited to the objects in the training set, causing the latent space to be discontinuous. Using a variational autoencoder may remedy or alleviate such concerns, and make the latent space (more) continuous and/or less discontinuous, or less sparse. By way of non-limiting example, FIG. 4B illustrates the encoder portion 40b of a variational autoencoder, including an input layer 41 of nodes, hidden layers 42, 43, and 44, and output vectors 45e and 45f. Output vector 45e may be a vector of means (a means vector), and output vector 45f may be a vector of standard deviations (a standard deviations vector). Encoder portion 40b generates output vectors 45e and 45f, which may be used and/or sampled to create the latent vector (here, sampled vector 45g) used for the decoding. Having a continuous latent space is more suitable for interpolating between different objects from the training set. Each of vectors 45e and 45f and 45g may have the same dimensionality (e.g., the same dimensionality x as discussed for FIG. 4A).

Sample component 114 may be configured to create vectors by sampling from pairs of multi-dimensional vectors generated by encoding component 112, such that a particular sampled multi-dimensional vector is created based on an encoding of a particular voxelized object. For example, with reference to FIG. 4B, sample component 114 may create sampled vector 45g by sampling from output vectors 45e and 45f. Accordingly, the same output vectors 45e and 45f could produce different sampled vectors.

Training component 120 may be configured to train encoders, decoders, and autoencoders, including but not limited to variational autoencoders. In some implementations, training component 120 may train generators and discriminators of a GAN. Training by training component 120 may be based on the loss information (as determined by, e.g., loss component 118) in training, e.g., by back-propagating loss information to an encoder and/or decoder. In some implementations, training component 120 may simultaneously optimize different types of loss information, such as reconstruction loss and Kullback-Leibler loss. In some implementations, both annotated and unannotated objects may be used to train encoders, decoders, and autoencoders. In some implementations, both annotated and unannotated objects may be used to train a GAN. Operations by training component 120 may complete the first stage of using natural language processing (NLP) to automatically generate three-dimensional objects in a virtual space. In some implementations, training component 120 may be used in the second stage of using natural language processing (NLP) to automatically generate three-dimensional objects in a virtual space, e.g., as part of training and/or fine-tuning a pretrained text-based system and/or other components of system 100.

Figure 7C:
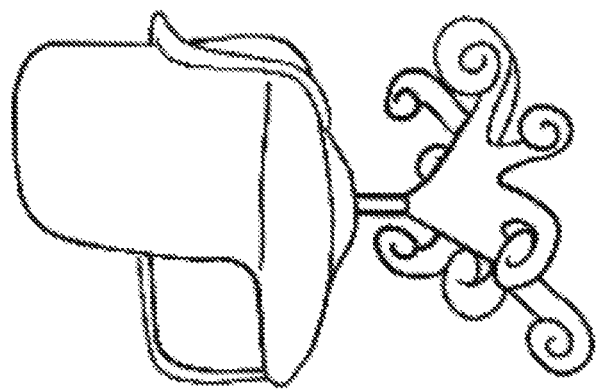
FIGS. 7A-7B-7C illustrate exemplary three-dimensional objects, as may be used or generated by a system configured for using natural language processing (NLP) to automatically generate three-dimensional objects in a virtual space.
Figure 7B:
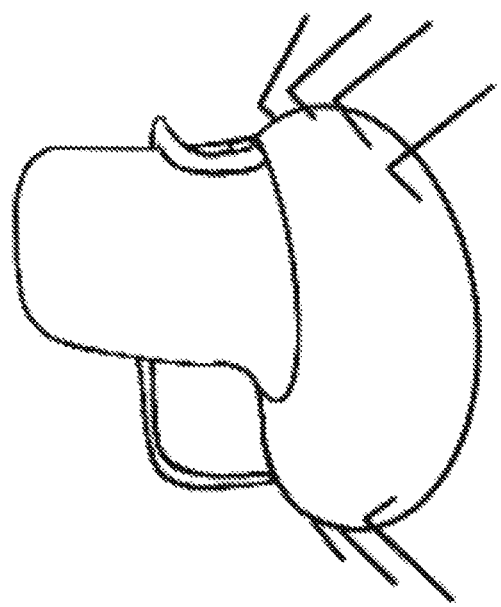
Figure 7A:
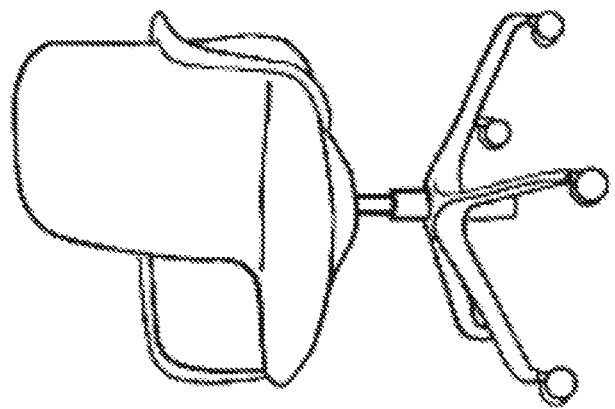

Fine-tuning component 122 may be configured to train and/or fine-tune a pretrained text-based system to generate multi-dimensional vectors having a particular dimensionality from textual descriptions. In some implementations, fine-tuning component 122 may be configured to train a transformer to generate multi-dimensional vectors having a particular dimensionality from textual descriptions. In some implementations, the pretrained text-based system may be Generative Pretrained Transformer 3 (GPT-3), or Generative Pretrained Transformer 2 (GPT-2), or Bidirectional Encoder Representations from Transformers (BERT), and/or another pretrained system. In some implementations, the pretrained text-based system may be fine-tuned using the textual descriptions included in annotated objects in the training set of three-dimensional objects. For example, a particular annotated object may include a following textual description of that particular object: "a red office chair with two armrests and five legs". By way of non-limiting example, FIG. 7A illustrates an exemplary three-dimensional object matching this particular textual description. After training, encoding component 112 may encode this particular object into one or more vectors having a particular dimensionality. The pretrained text-based system may be fine-tuned to generate the same one or more vectors (or as similar as possible) based on an input of "a red office chair with two armrests and five legs". In some implementations, fine-tuning component 122 may be fine-tuned by examples and/or prompts. For example, the examples and/or prompts may be based on a combination of individual textual descriptions of individual annotated objects and the corresponding individual latent vectors for those individual objects. In some implementations, objects used for fine-tuning (using examples and/or prompts) may be limited to annotated objects.

In some implementations, loss information used to train and/or finetune a pretrained text-based system or a transformer may be determined (e.g., by loss component 118) based on comparisons of latent vectors that are generated through different dataflows. For example, a first latent vector as generated by the trained encoder portion of the variational autoencoder (for a particular voxelized object) may be compared with a second latent vector as generated by the pretrained text-based system (based on the particular textual description that is associated with the particular voxelized object). In some implementations, loss information used to train and/or finetune a pretrained text-based system or a transformer may be determined (e.g., by loss component 118) based on comparisons of voxelized objects that are obtained and/or generated through different dataflows. For example, a first voxelized object as obtained by import component 108 may be compared with a second voxelized object as generated by decoding component 116 (based on the particular textual description that is associated with the first voxelized object). In this latter case, the loss information used in the second stage may be similar to the loss information used in the first stage. In some implementations, operations by fine-tuning component 122 may complete the second stage of using natural language processing (NLP) to automatically generate three-dimensional objects in a virtual space.

User input component 124 may be configured to receive user input from users. For example, users may provide user input through user interfaces 125. The user input may include text describing objects. The text may be natural language, similar to the language used to pretrain the pretrained text-based system. For example, the text may be similar to the textual descriptions of annotated objects, though modified, mixed, and/or otherwise adapted. For example, a particular user-provided textual input may be: "an office chair with two armrests and eight legs". Perhaps, during the first stage of training the autoencoder (and/or encoding component 112 and/or decoding component 116) to generate latent vectors and subsequently decode latent vectors into voxelized three-dimensional objects, none of the chairs in the sets of objects obtained by import component 108 may have had eight legs. Perhaps the sets of objects obtained by import component 108 included other types of objects that have eight legs.

Vector component 126 may be configured to generate, using the fine-tuned pretrained text-based system, a (user-provided) multi-dimensional vector from user-provided text (i.e., in user input). In some implementations, vector component 126 may obtain the user-provided text from user input component 124. The user-provided text may serve as an input or prompt to the fine-tuned pretrained text-based system, which generates a particular latent vector that corresponds to the user-provided text. Decoding component 116 may be configured to decode this particular patent vector into a three-dimensional object that corresponds to the user-provided text. For example, using the same particular user-provided textual input as described in the preceding paragraph, the pretrained text-based system may have encountered different types of objects, language, and/or other descriptions during pretraining that included eight legs. Accordingly, a latent vector generated by vector component 126 based on the particular user-provided textual input of "an office chair with two armrests and eight legs" may be an interpolation (within a continuous and/or at least somewhat continuous latent space) between vectors for objects classified as office chairs and vectors for objects that include eight legs. By way of non-limiting example, FIG. 7B illustrates an exemplary three-dimensional object matching this particular textual description, based on the fact that spiders have eight legs. By way of non-limiting example, FIG. 7C illustrates another exemplary three-dimensional object matching this particular textual description, based on the fact that octopi have eight legs (or arms).

As another example, a particular user may provide the following description for a to-be-generated object: "a tree like a lantern." Perhaps none of the annotated objects during training matches such a description, though the sets of objects obtained by import component 108 may have included many trees, and many lanterns. A latent vector generated by vector component 126 based on this description may be an interpolation between vectors for objects classified as trees and vectors for objects classified as lanterns. For example, a resulting object generated from such a latent vector may resemble a tree having a trunk that looks like a lantern. Or, for example, a resulting object generated from such a latent vector may resemble a tree having lanterns instead of leaves, or lanterns instead of branches.

Presentation component 128 may be configured to present, to the user, voxelized three-dimensional objects. In particular, presentation component 128 may present the particular three-dimensional object that corresponds to the user's input. In some implementations, presentations may be provided to users through user interfaces 125.

By way of non-limiting example, FIG. 6 illustrates an exemplary dataflow 60 for different stages in a system configured for using natural language processing (NLP) to automatically generate three-dimensional objects in a virtual space. By way of non-limiting example, during the first stage, one or more training sets of three-dimensional objects (including, e.g., a voxelized object 61a as input) may be used to train encoder portion 61 and decoder portion 62 of an autoencoder. For example, encoder portion 61 may be similar to encoder portion 40b in FIG. 4B, and decoder portion 62 may be similar to encoder portion 40 as shown in FIG. 4A, but with input and output reversed, and the data flowing in the opposite direction. Decoder portion 62 generates a voxelized object 66, which may be compared to voxelized object 61a to (determine loss information 67 and) train encoder portion 61 and decoder portion 62 during the first stage (e.g., encoder portion 61 may be trained using backpropagation 68a based on loss information 67, and/or decoder portion 62 may be trained using back propagation 68b based on loss information 67). During a second stage, textual input 63 (taken from annotated objects in the training set) are used to fine-tune pretrained text-based system 64 to generate latent vectors 65 (such that these latent vectors are as similar as possible to the latent vectors generated by encoder portion 61 using the same annotated objects as input). In some implementations, the second stage may use loss information 67 that is determined based on comparisons between different latent vectors. In some implementations, the second stage may use loss information 67 that is determined based on comparisons between different voxelized objects, such as voxelized object 66 and voxelized object 61*a*, subsequent to which loss information 67 may be used to finetune and/or train pretrained text-based system 64.

Finally, during a third stage, finetuned pretrained text-based system 64 is connected to decoder portion 62, such that new textual input 63 (during the third stage, such input may be provided by a user) is used to generate a corresponding new latent vector 65 (e.g., bypassing encoder portion 61), which is subsequently used by decoder portion 62 to generate a corresponding new voxelized object 66, which may be presented to the user, e.g., in a user interface (e.g., for use in a virtual space within one or more gaming platforms 105).

Referring to FIG. 1, user interfaces 125 may be configured to facilitate interaction between users 123 and system 100 and/or between users 123 and client computing platforms 104. For example, user interfaces 125 may provide an interface through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between users.

Referring to FIG. 1, in some implementations, server(s) 102, client computing platform(s) 104, and/or external resources 136 may be operatively linked via one or more electronic communication links. For example, such electronic communication links may be established, at least in part, via one or more networks 13, including but not limited to the Internet and/or other networks. It will be appreciated that this is not intended to be limiting, and that the scope of this disclosure includes implementations in which server(s) 102, client computing platform(s) 104, and/or external resources 136 may be operatively linked via some other communication media.

A given client computing platform 104 may include one or more processors configured to execute computer program components. The computer program components may be configured to enable an expert or user associated with the given client computing platform 104 to interface with system 100 and/or external resources 136, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a smart watch, a gaming console, and/or other computing platforms.

External resources 136 may include sources of information outside of system 100, external entities participating with system 100, and/or other resources. For example, in some implementations, external resources 136 may include an online exchange platform through which assets may be exchanged between different users. In some implementations, external resources 136 may provide information regarding user-specific marketplace behavior, user-specific social media behavior, and/or other types of user-specific behavior. In some implementations, some or all of the functionality attributed herein to external resources 136 may be provided by resources included in system 100.

Server(s) 102 may include electronic storage 134, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 134 may comprise non-transitory storage media that electronically stores information. The electronic storage media of electronic storage 134 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media electronic storage 134 may include one or more virtual storage resources (e.g., cloud storage, a virtual private network, and/or other virtual storage resources). Electronic storage 134 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, 126, and/or 128, and/or other components. Processor(s) 132 may be configured to execute components 108, 110, 112, 114, 116, 118, 120, 122, 124, 126, and/or 128, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 126, and/or 128 are illustrated in FIG. 1 as being implemented within a single processing unit, in implementations in which processor(s) 132 includes multiple processing units, one or more of components 108, 110, 112, 114, 116, 118, 120, 122, 124, 126, and/or 128 may be implemented remotely from the other components. The description of the functionality provided by the different components 108, 110, 112, 114, 116, 118, 120, 122, 124, 126, and/or 128 described below is for illustrative purposes, and is not intended to be limiting, as any of components 108, 110, 112, 114, 116, 118, 120, 122, 124, 126, and/or 128 may provide more or less functionality than is described. For example, one or more of components 108, 110, 112, 114, 116, 118, 120, 122, 124, 126, and/or 128 may be eliminated, and some or all of its functionality may be provided by other ones of components 108, 110, 112, 114, 116, 118, 120, 122, 124, 126, and/or 128. As another example, processor(s) 132 may be configured to execute one or more additional components that may perform some or all of the functionality attributed below to one of components 108, 110, 112, 114, 116, 118, 120, 122, 124, 126, and/or 128.

Figure 2:
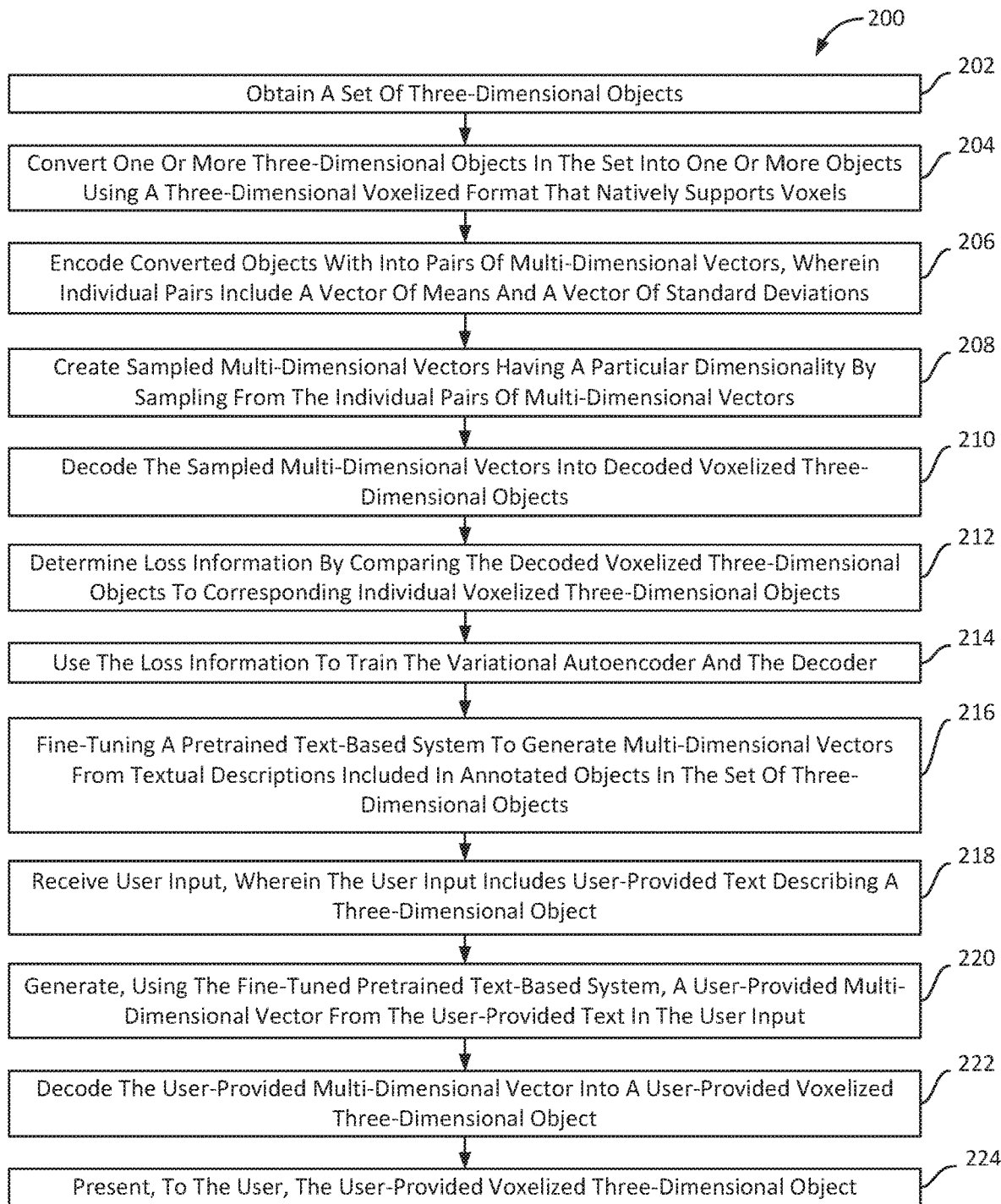
FIG. 2 illustrates a method for using natural language processing (NLP) to automatically generate three-dimensional objects in a virtual space, in accordance with one or more implementations.

FIG. 2 illustrates a method 200 for using natural language processing (NLP) to automatically generate three-dimensional objects in a virtual space, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, a set of three-dimensional objects is obtained. The set includes an annotated object that includes a textual description of the annotated object and an unannotated object that lacks a description. The annotated object uses a first three-dimensional format. The unannotated object uses a second three-dimensional format. In some embodiments, operation 202 is performed by an import component the same as or similar to import component 108 (shown in FIG. 1 and described herein).

At an operation 204, one or more three-dimensional objects in the set are converted into one or more objects using a three-dimensional voxelized format that natively supports voxels, responsive to using three-dimensional formats that fail to support voxels, such that the set includes voxelized three-dimensional objects. The voxelized three-dimensional objects include a first voxelized object based on the annotated object. In some embodiments, operation 204 is performed by a voxelization component the same as or similar to voxelization component 110 (shown in FIG. 1 and described herein).

At an operation 206, the voxelized three-dimensional objects are encoded, using a variational autoencoder, into pairs of multi-dimensional vectors. Individual pairs include a vector of means and a vector of standard deviations. In some embodiments, operation 206 is performed by an encoding component the same as or similar to encoding component 112 (shown in FIG. 1 and described herein).

At an operation 208, sampled multi-dimensional vectors are created that have a particular dimensionality by sampling from the individual pairs of multi-dimensional vectors such that a first sampled multi-dimensional vector is created based on an encoding of the first voxelized object. In some embodiments, operation 208 is performed by a sample component the same as or similar to sample component 114 (shown in FIG. 1 and described herein).

At an operation 210, the sampled multi-dimensional vectors are decoded, using a decoder, into decoded voxelized three-dimensional objects. In some embodiments, operation 210 is performed by a decoding component 116 the same as or similar to decoding component 116 (shown in FIG. 1 and described herein).

At an operation 212, loss information is determined by comparing the decoded voxelized three-dimensional objects to corresponding individual voxelized three-dimensional objects. In some embodiments, operation 212 is performed by a loss component the same as or similar to loss component 118 (shown in FIG. 1 and described herein).

At an operation 214, the loss information is used to train the variational autoencoder and the decoder. In some embodiments, operation 214 is performed by a training component the same as or similar to training component 120 (shown in FIG. 1 and described herein).

At an operation 216, a pretrained text-based system is fine-tuned to generate multi-dimensional vectors having the particular dimensionality from textual descriptions included in annotated objects in the set of three-dimensional objects. One or more prompts for the pretrained text-based system are based on a combination of the textual description of the annotated object and the first sampled multi-dimensional vector. In some embodiments, operation 216 is performed by a fine-tuning component the same as or similar to fine-tuning component 122 (shown in FIG. 1 and described herein).

At an operation 218, user input is received from a user. The user input includes user-provided text describing a three-dimensional object. In some embodiments, operation 218 is performed by a user input component the same as or similar to user input component 124 (shown in FIG. 1 and described herein).

At an operation 220, using the fine-tuned pretrained text-based system, a user-provided multi-dimensional vector is generated from the user-provided text in the user input. In some embodiments, operation 220 is performed by a vector component the same as or similar to vector component 126 (shown in FIG. 1 and described herein).

At an operation 222, the user-provided multi-dimensional vector is decoded into a user-provided voxelized three-dimensional object. In some embodiments, operation 222 is performed by a decoding component the same as or similar to decoding component 116 (shown in FIG. 1 and described herein).

At an operation 224, the user-provided voxelized three-dimensional object is presented to the user. In some embodiments, operation 224 is performed by a presentation component the same as or similar to presentation component 128 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to use natural language processing (NLP) to automatically generate three-dimensional objects in a virtual space, the system comprising:
  electronic storage configured to electronically store information, wherein the stored information includes a set of three-dimensional objects, wherein the set includes an annotated object that includes a textual description of the annotated object, wherein the annotated object uses a first three-dimensional format; and
  one or more hardware processors configured by machine-readable instructions to:
    obtain the set of three-dimensional objects, wherein the set of three-dimensional objects includes voxelized three-dimensional objects, wherein the voxelized three-dimensional objects include a first voxelized object based on the annotated object;
    encode, using a variational autoencoder that includes an encoder and a decoder, the voxelized three-dimensional objects into pairs of multi-dimensional vectors, wherein individual pairs include a vector of means and a vector of standard deviations;
    create sampled multi-dimensional vectors having a particular dimensionality by sampling from the individual pairs of multi-dimensional vectors such that a first sampled multi-dimensional vector is created based on an encoding of the first voxelized object;
    decode, using the decoder, the sampled multi-dimensional vectors into decoded voxelized three-dimensional objects;
    determine loss information for the decoded voxelized three-dimensional objects by comparing the decoded voxelized three-dimensional objects to corresponding individual voxelized three-dimensional objects;
    use the loss information to train the variational autoencoder;
    fine-tune a pretrained text-based system to generate multi-dimensional vectors having the particular dimensionality from textual descriptions included in annotated objects in the set of three-dimensional objects, wherein one or more prompts for the pretrained text-based system are based on a combination of the textual description of the annotated object and the first sampled multi-dimensional vector;
    receive, from a user, a user input, wherein the user input includes user-provided text describing a three-dimensional object;
    generate, using the fine-tuned pretrained text-based system, a user-provided multi-dimensional vector from the user-provided text in the user input;
    decode, using the decoder, the user-provided multi-dimensional vector into a first voxelized three-dimensional object; and
    present, to the user, the first voxelized three-dimensional object.

2. The system of claim 1, wherein the set of three-dimensional objects includes one or more objects in one or more three-dimensional formats that fail to support voxels, wherein the one or more three-dimensional formats that fail to support voxels include one or both of a vector-based three-dimensional format and a polygon-based three-dimensional format.

3. The system of claim 1, wherein the three-dimensional voxelized format that natively supports voxels is selected from one of .OBJ, .JSON, .XML, .SCHEMATIC, .SCAD, .STL, .QB, and .VOX.

4. The system of claim 1, wherein the loss information includes reconstruction loss and Kullback-Leibler loss, wherein the Kullback-Leibler loss is based on a sum of Kullback-Leibler divergences.

5. The system of claim 1, wherein the sampled multi-dimensional vectors are decoded using a Generative Adversarial Network that includes a generator and a discriminator.

6. The system of claim 5, wherein the decoder is used as the generator of the Generative Adversarial Network.

7. The system of claim 6, wherein the discriminator of the Generative Adversarial Network distinguishes between objects from the set of three-dimensional objects and the decoded voxelized three-dimensional objects as decoded by the decoder.

8. The system of claim 1, wherein the pretrained text-based system is Generative Pretrained Transformer 3 (GPT-3).

9. The system of claim 1, wherein the user input is received through a user interface, and wherein the first voxelized three-dimensional object is presented through the user interface.

10. A method to use natural language processing (NLP) to automatically generate three-dimensional objects in a virtual space, the method being implemented in a computer system, the method comprising:
  obtaining a set of three-dimensional objects, wherein the set includes an annotated object that includes a textual description of the annotated object, wherein the annotated object uses a first three-dimensional format, wherein the set of three-dimensional objects includes voxelized three-dimensional objects, wherein the voxelized three-dimensional objects include a first voxelized object based on the annotated object;
  encoding, using a variational autoencoder that includes an encoder and a decoder, the voxelized three-dimensional objects into pairs of multi-dimensional vectors, wherein individual pairs include a vector of means and a vector of standard deviations;
  creating sampled multi-dimensional vectors having a particular dimensionality by sampling from the individual pairs of multi-dimensional vectors such that a first sampled multi-dimensional vector is created based on an encoding of the first voxelized object;
  decoding, using the decoder, the sampled multi-dimensional vectors into decoded voxelized three-dimensional objects;
  determining loss information by comparing the decoded voxelized three-dimensional objects to corresponding individual voxelized three-dimensional objects;
  using the loss information to train the variational autoencoder, including the decoder;
  fine-tuning a pretrained text-based system to generate multi-dimensional vectors having the particular dimensionality from textual descriptions included in annotated objects in the set of three-dimensional objects, wherein one or more prompts for the pretrained text-based system are based on a combination of the textual description of the annotated object and the first sampled multi-dimensional vector;
  receiving, from a user, a user input, wherein the user input includes user-provided text describing a three-dimensional object;

generating, using the fine-tuned pretrained text-based system, a user-provided multi-dimensional vector from the user-provided text in the user input;

decoding, using the decoder, the user-provided multi-dimensional vector into a first voxelized three-dimensional object; and presenting, to the user, the first voxelized three-dimensional object.

11. The method of claim 10, wherein the set of three-dimensional objects includes one or more objects in one or more three-dimensional formats that fail to support voxels, wherein the one or more three-dimensional formats that fail to support voxels include one or both of a vector-based three-dimensional format and a polygon-based three-dimensional format.

12. The method of claim 10, wherein the three-dimensional voxelized format that natively supports voxels is selected from one of .OBJ, .JSON, .XML, .SCHEMATIC, .SCAD, .STL, .QB, and .VOX.

13. The method of claim 10, wherein the loss information includes reconstruction loss and Kullback-Leibler loss, wherein the Kullback-Leibler loss is based on a sum of Kullback-Leibler divergences.

14. The method of claim 10, wherein the sampled multi-dimensional vectors are decoded using a Generative Adversarial Network that includes a generator and a discriminator.

15. The method of claim 14, wherein the decoder is used as the generator of the Generative Adversarial Network.

16. The method of claim 15, wherein the discriminator of the Generative Adversarial Network distinguishes between objects from the set of three-dimensional objects and the decoded voxelized three-dimensional objects as decoded by the decoder.

17. The method of claim 10, wherein the pretrained text-based system is Generative Pretrained Transformer 3 (GPT-3).

18. The method of claim 10, wherein the user input is received through a user interface, and wherein the user-provided voxelized three-dimensional object is presented through the user interface.

* * * * *